US009255510B2

(12) United States Patent
Solbrig et al.

(10) Patent No.: US 9,255,510 B2
(45) Date of Patent: Feb. 9, 2016

(54) AMMONIA (NH$_3$) STORAGE CONTROL SYSTEM AND METHOD BASED ON A NITROGEN OXIDE(NO$_x$) SENSOR

(75) Inventors: Charles E. Solbrig, Ypsilanti, MI (US); Ognyan N. Yanakiev, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1242 days.

(21) Appl. No.: 12/400,156

(22) Filed: Mar. 9, 2009

(65) Prior Publication Data
US 2010/0223908 A1 Sep. 9, 2010

(51) Int. Cl.
*F01N 3/00* (2006.01)
*F01N 3/20* (2006.01)
(Continued)

(52) U.S. Cl.
CPC ............... *F01N 3/208* (2013.01); *B01D 53/90* (2013.01); *B01D 53/9495* (2013.01); *F02D 41/0235* (2013.01); *F02D 41/1462* (2013.01); *F02D 41/1463* (2013.01); *B01D 53/944* (2013.01); *B01D 53/9418* (2013.01); *B01D 53/9477* (2013.01); *B01D 2251/2067* (2013.01); *B01D 2255/911* (2013.01); *F01N 2570/18* (2013.01);
(Continued)

(58) Field of Classification Search
USPC ........... 60/274, 276, 285, 286, 295, 301, 303, 60/277
See application file for complete search history.

(56) References Cited

U.S. PATENT DOCUMENTS 5,691,037 A 11/1997 McCutcheon et al.
6,309,536 B1 * 10/2001 Inagaki et al. ................ 205/781
(Continued)

FOREIGN PATENT DOCUMENTS

DE 10100420 A1 7/2002
DE 102004031624 A1 2/2006
(Continued)

OTHER PUBLICATIONS

Office Action dated Aug. 1, 2011 from the German Patent Office for German Patent Application No. 10 2010 009 042.5; 5 pages.

*Primary Examiner* — Thomas Denion
*Assistant Examiner* — Matthew T Largi

(57) ABSTRACT

A control system includes an upstream nitrogen oxide (NO$_x$) control module that increases an upstream NO$_x$ level based on an initial upstream NO$_x$ level in an exhaust system, and an ammonia (NH$_3$) storage condition detection module that detects a NH$_3$ storage condition based on a difference in a downstream NO$_x$ level before and after the upstream NO$_x$ level is increased. A method includes increasing an upstream NO$_x$ level based on an initial upstream NO$_x$ level in an exhaust system, and detecting an NH$_3$ storage condition based on a difference in a downstream NO$_x$ level before and after the upstream NO$_x$ level is increased.

18 Claims, 4 Drawing Sheets

(51) Int. Cl.
  *B01D 53/90* (2006.01)
  *B01D 53/94* (2006.01)
  *F02D 41/02* (2006.01)
  *F02D 41/14* (2006.01)

(52) U.S. Cl.
  CPC ..... *F01N 2610/02* (2013.01); *F01N 2900/0404* (2013.01); *F01N 2900/0408* (2013.01); *F01N 2900/1402* (2013.01); *F01N 2900/1616* (2013.01); *F01N 2900/1622* (2013.01); *F02D 2041/1469* (2013.01); *Y02T 10/24* (2013.01)

(56) References Cited

U.S. PATENT DOCUMENTS

| | | | |
|---|---|---|---|
| 6,345,496 B1 * | 2/2002 | Fuwa et al. | 60/274 |
| 6,427,439 B1 * | 8/2002 | Xu et al. | 60/286 |
| 6,725,647 B2 * | 4/2004 | Pfeifer et al. | 60/274 |
| 6,872,365 B1 * | 3/2005 | Boegner et al. | 422/174 |
| 6,892,528 B2 * | 5/2005 | Okada et al. | 60/277 |
| 7,332,135 B2 * | 2/2008 | Gandhi et al. | 422/177 |
| 8,099,946 B2 * | 1/2012 | Hinz et al. | 60/277 |
| 8,282,901 B2 * | 10/2012 | Petrocelli et al. | 423/242.1 |
| 2005/0282285 A1 * | 12/2005 | Radhamohan et al. | 436/55 |
| 2007/0082783 A1 * | 4/2007 | Hu et al. | 477/100 |
| 2007/0092426 A1 * | 4/2007 | Driscoll et al. | 423/352 |
| 2008/0103684 A1 * | 5/2008 | Allmer et al. | 701/114 |
| 2009/0049899 A1 * | 2/2009 | Hjorsberg et al. | 73/114.75 |
| 2009/0199543 A1 * | 8/2009 | Sawada et al. | 60/276 |
| 2009/0272102 A1 * | 11/2009 | Ofoli et al. | 60/286 |
| 2010/0199638 A1 * | 8/2010 | Yoshikawa | 60/277 |
| 2011/0162350 A1 * | 7/2011 | Ponnathpur | 60/274 |
| 2011/0252788 A1 * | 10/2011 | Kleinfeld | 60/602 |

FOREIGN PATENT DOCUMENTS

| | | | |
|---|---|---|---|
| JP | 2003293745 A * | 10/2003 | F01N 3/20 |
| JP | 2008157136 A * | 7/2008 | |
| WO | WO 2008009940 A2 * | 1/2008 | F01N 3/20 |

* cited by examiner

AMMONIA (NH₃) STORAGE CONTROL SYSTEM AND METHOD BASED ON A NITROGEN OXIDE(NO$_x$) SENSOR

FIELD

The present disclosure relates to emissions control systems and methods, and more particularly to ammonia (NH$_3$) storage control systems and methods based on a nitrogen oxide (NO$_x$) sensor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture to generate drive torque. The combustion process generates exhaust that is exhausted from the engine to the atmosphere. The exhaust contains nitrogen oxides (NO$_x$), carbon dioxide (CO$_2$), carbon monoxide (CO), and particulates. An exhaust system treats the exhaust to reduce emissions prior to being released to the atmosphere.

In an exemplary exhaust system, a dosing system injects a dosing agent (e.g., urea) into the exhaust upstream of a selective catalytic reduction (SCR) catalyst. The dosing agent breaks down to form ammonia (NH$_3$) that is stored in the SCR catalyst. NH$_3$ stored in the SCR catalyst reacts with NO$_x$ to form nitrogen (N$_2$) and water (H$_2$O), which reduces the NO$_x$ levels released to the atmosphere.

SUMMARY

The present disclosure provides a control system including an upstream nitrogen oxide (NO$_x$) control module that increases an upstream NOx level based on an initial upstream NO$_x$ level in an exhaust system, and an ammonia (NH$_3$) storage condition detection module that detects a NH$_3$ storage condition based on a difference in a downstream NO$_x$ level before and after the upstream NO$_x$ level is increased. In addition, the present disclosure provides a method including increasing an upstream NO$_x$ level based on an initial upstream NO$_x$ level in an exhaust system, and detecting an NH$_3$ storage condition based on a difference in a downstream NO$_x$ level before and after the upstream NO$_x$ level is increased.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
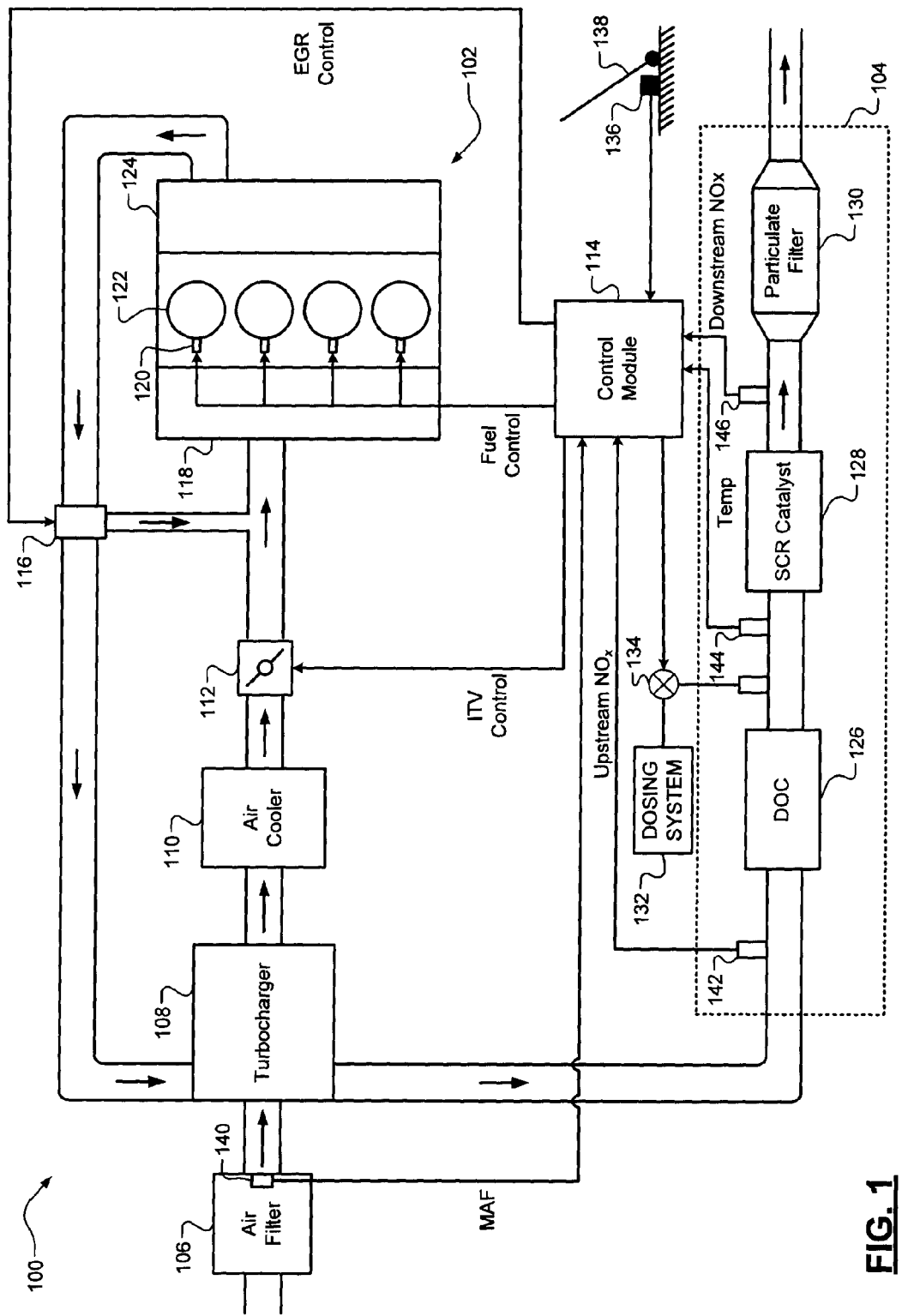
FIG. 1 is a schematic illustration of a vehicle including an emission control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit that provides the described functionality.

An SCR catalyst can reduce NO$_x$ emissions effectively when the amount of NH$_3$ stored in the SCR catalyst is controlled. For example, the NH$_3$ storage level may be maintained to maximize the NO$_x$ conversion efficiency under various operating conditions. As the temperature of the SCR catalyst increases, the NH$_3$ storage level may be reduced to avoid NH$_3$ slip (i.e., excess NH$_3$ released from the SCR catalyst).

An emissions control system and method according to the present disclosure temporarily increases a nitrogen oxide (NO$_x$) level upstream of a selective catalytic reduction (SCR) catalyst and determines an ammonia (NH$_3$) storage condition in the SCR catalyst based on a NO$_x$ level downstream of the SCR catalyst. The upstream NOx level may be increased by increasing a mass airflow (MAF) entering an engine and/or adjusting fuel injection parameters such as injection timing. The magnitude of the temporary upstream NOx level increase may be based on an initial upstream NO$_x$ level and/or an exhaust temperature, and the period of the temporary upstream NO$_x$ level increase may be predetermined and/or adjusted such that a desired total NO$_x$ mass enters the SCR catalyst. A NH$_3$ slip condition is detected when a downstream NO$_x$ level change in response to the temporary upstream NO$_x$ level increase is less than a minimum downstream NO$_x$ level change. A low NH$_3$ storage level condition is detected when the downstream NO$_x$ level change in response to the temporary upstream NO$_x$ level increase is greater than a maximum downstream NO$_x$ level change.

Referring now to FIG. 1, a functional block diagram of a vehicle 100 is presented. The vehicle 100 includes an engine 102 and an exhaust system 104. The engine 102 combusts a mixture of air and diesel fuel to produce drive torque and releases exhaust into the exhaust system 104. The exhaust system 104 treats exhaust to reduce emissions released to the atmosphere.

Air may enter the engine 102 through an air filter 106 and continue through the intake side of a turbocharger 108. The turbocharger 108 compresses the air using turbine (not shown) that is powered by exhaust from the engine 102. The compressed air may pass through an air cooler 110 or other conditioners before passing through an intake throttle valve (ITV) 112.

A control module 114 positions the ITV 112 at various angles to adjust the mass flow rate of the compressed air. Exhaust gases may be recirculated via an exhaust gas recirculation (EGR) valve 116 to create an air mixture as the air enters an intake manifold 118. The control module 114 controls the position of the EGR valve 116 to adjust the amount of exhaust recirculated.

The air mixture from the intake manifold 118 is combined with fuel from fuel injectors 120 in cylinders 122 and the resulting air-fuel mixture is combusted to produce torque. Although FIG. 1 depicts four cylinders, the engine 102 may include additional or fewer cylinders 122. Exhaust gases exit the cylinders 122 through an exhaust manifold 124 and pass through the turbocharger 108 to the exhaust system 104.

The exhaust system 104 may include a diesel oxidation catalyst (DOC) 126, a selective reduction catalytic (SCR) catalyst 128, and a particulate filter 130. The DOC 126 reduces particulate matter, hydrocarbons, and carbon monoxide in the exhaust through oxidation. The SCR catalyst 128 reacts with $NO_x$ in the exhaust to reduce $NO_x$ emissions. The particulate filter 130 collects particulate matter from the exhaust before the exhaust is released to the atmosphere.

A dosing system 132 may inject a dosing agent (e.g., urea) into the exhaust downstream of the DOC 126. The control module 114 regulates the amount of dosing agent injected via a dosing valve 134. The dosing agent breaks down to form ammonia ($NH_3$) that is stored in the SCR catalyst 128. $NH_3$ stored in the SCR catalyst 128 reacts with $NO_x$ in the exhaust to form nitrogen ($N_2$) and water ($H_2O$), which reduces $NO_x$.

The control module 114 communicates with an accelerator pedal sensor 136 and a mass airflow (MAF) sensor 140. The accelerator pedal sensor 136 generates a signal indicating a position of an accelerator pedal 138. The MAF sensor 140 generates a signal indicating a mass of air passing through the intake manifold 118. The control module 114 uses the pedal position signal and the MAF signal to control the ITV 112, the EGR valve 116, and the fuel injectors 120.

The exhaust system 104 may include an upstream $NO_x$ sensor 142, a temperature sensor 144, a downstream $NO_x$ sensor 146, and other sensors that detect exhaust characteristics. The upstream $NO_x$ sensor 142 detects an upstream $NO_x$ level (i.e., $NO_x$ level upstream from the SCR catalyst 128) and generates a signal indicating the upstream $NO_x$ level. The temperature sensor 144 detects an exhaust temperature upstream from the SCR catalyst 128 and generates a signal indicating the exhaust temperature. The downstream $NO_x$ sensor 146 detects a downstream $NO_x$ level (i.e., $NO_x$ level downstream from the SCR catalyst 128) and generates a signal indicating the downstream $NO_x$ level. The control module 114 receives the signals generated by the upstream $NO_x$ sensor 142, the temperature sensor 144 and the downstream $NO_x$ sensor 146.

Figure 2:
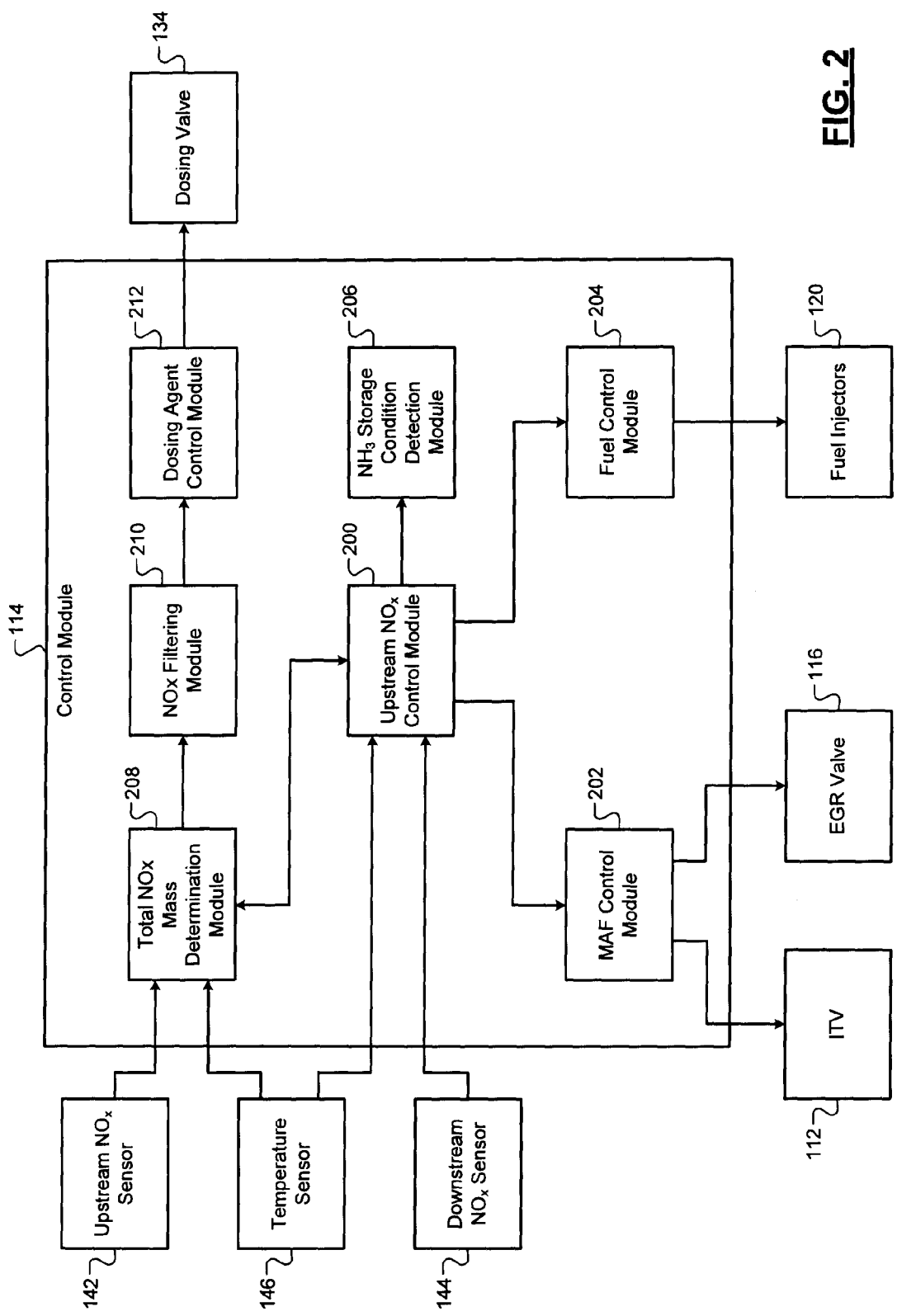
FIG. 2 is a functional block diagram of a control module of the emission control system of FIG. 1 according to the present disclosure.

Referring now to FIG. 2, the control module 114 includes an upstream $NO_x$ control module 200, a MAF control module 202, a fuel control module 204, a $NH_3$ storage condition detection module 206, a total $NO_x$ mass determination module 208, a $NO_x$ filtering module 210, and a dosing agent control module 212. The upstream $NO_x$ control module 200 increases the upstream $NO_x$ level based on the exhaust temperature received from the temperature sensor 144 and/or the downstream $NO_x$ level received from the downstream $NO_x$ sensor 146. The upstream $NO_x$ control module 200 may increase the upstream $NO_x$ level for a predetermined period. Alternately, the upstream $NO_x$ control module 200 may increase the upstream $NO_x$ level for a period that allows a desired total $NO_x$ mass to enter the SCR catalyst 128. The predetermined period and the desired total $NO_x$ mass may be selected such that a change in the downstream $NO_x$ level received from the downstream $NO_x$ sensor 146 may be detected.

The upstream $NO_x$ control module 200 may increase the upstream NOx level by controlling the MAF control module 202 to increase the MAF. The MAF control module 202 may increase the MAF by moving the EGR valve 116 toward a closed position. Moving the EGR valve 116 toward a closed position allows more air to flow through the ITV 112, which increases the MAF entering the engine 102. Alternatively, the MAF control module 202 may increase the MAF by moving the ITV 112 toward an open position.

In addition, the upstream NOx control module 200 may increase the upstream $NO_x$ level by controlling the fuel control module 204 to advance an injection timing of the fuel injectors 120. Advancing the injection timing increases a combustion temperature in the cylinders 122. Increasing the combustion temperature causes the engine 102 to produce more $NO_x$ emissions. Moreover, the injection timing may be delayed to offset undesirable effects resulting from the temporarily increased upstream $NO_x$ level, such as elevated engine noise resulting from an increased burn rate.

The $NH_3$ storage condition detection module 206 detects an $NH_3$ storage condition in the SCR catalyst 128 based on the downstream $NO_x$ level received from the downstream $NO_x$ sensor 146 when the upstream $NO_x$ level is temporarily increased. The $NH_3$ storage condition detection module 206 detects an $NH_3$ slip condition when a downstream $NO_x$ level change in response to the temporary upstream $NO_x$ level increase is less than a minimum downstream $NO_x$ level change. The downstream $NO_x$ level change is a difference in the downstream $NO_x$ level before and after the upstream $NO_x$ level is temporarily increased. The $NH_3$ storage condition detection module 206 detects a low $NH_3$ level storage condition when the downstream $NO_x$ level change is greater than a maximum downstream $NO_x$ level change.

The total $NO_x$ mass determination module 208 determines the total $NO_x$ mass entering the SCR catalyst 128 as a result of the temporary upstream $NO_x$ level increase. The total $NO_x$ mass may be determined based on the upstream $NO_x$ level received from the upstream $NO_x$ sensor 142, the exhaust temperature received from the temperature sensor 144, and/or the predetermined period for the upstream $NO_x$ level increase received from the upstream $NO_x$ control module 200. The total $NO_x$ mass determination module 208 may adjust the predetermined period for the upstream $NO_x$ level increase based on the determined total $NO_x$ mass to achieve a desired total $NO_x$ mass. The total $NO_x$ mass determination module 208 may provide the adjusted predetermined period for the upstream $NO_x$ level increase to the upstream $NO_x$ control module 200.

The $NO_x$ filtering module 210 determines a filtered $NO_x$ level based on the upstream $NO_x$ level received from the upstream $NO_x$ sensor 142. More specifically, the $NO_x$ filtering module 210 filters the upstream $NO_x$ level to determine the filtered $NO_x$ level. The upstream $NO_x$ level may be filtered at a frequency that reduces or removes the increase in the upstream $NO_x$ level due to the temporary upstream $NO_x$ level increase. Filtering the upstream $NO_x$ level in this manner may prevent over-saturating the SCR catalyst 128 with $NH_3$.

The dosing agent control module 212 receives the filtered $NO_x$ level from the $NO_x$ filtering module 210 and controls the dosing valve 134 based thereon. More specifically, the dosing agent control module 212 controls an amount of dosing agent injected based on the filtered $NO_x$ level. For example, the dosing agent control module 212 may inject more dosing agent when the filtered $NO_x$ level increases. Conversely, the dosing agent control module 212 may inject less dosing agent when the filtered $NO_x$ level decreases. Alternatively, the dosing agent control module 212 may suspend injection of the dosing agent when the upstream $NO_x$ level is temporarily increased.

Figure 3:
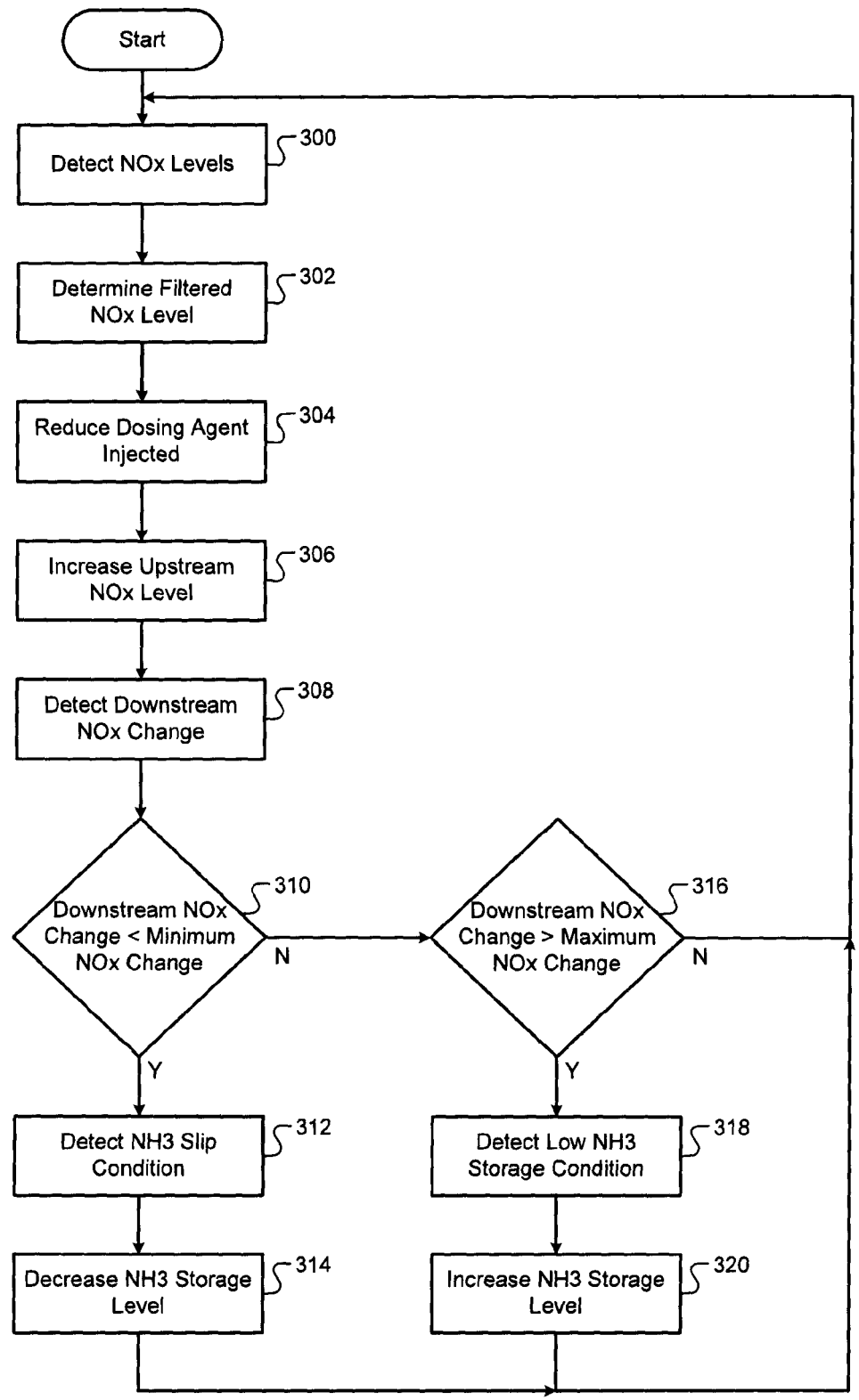
FIG. 3 is a flowchart illustrating exemplary steps of a NH$_3$ storage control method according to the present disclosure.

Referring now to FIG. 3, a flowchart illustrates exemplary steps of a $NH_3$ storage control method according to the principles of the present disclosure. In step 300, control detects the upstream and downstream $NO_x$ levels. In step 302, control determines the filtered NOx level based on the upstream NOx level. In step 304, control may reduce the level of dosing agent injected to reduce the $NH_3$ storage level in the SCR catalyst 128 to a desired $NH_3$ storage level. In step 306, control increases the upstream $NO_x$ level.

Control may increase the upstream $NO_x$ level for a predetermined period. Alternatively, control may increase the upstream $NO_x$ level so that a desired total $NO_x$ mass enters the SCR catalyst 128. The predetermined period and the desired total $NO_x$ mass may be selected such that the change in the downstream $NO_x$ level may be detected.

Control may increase the magnitude of the upstream $NO_x$ level based on the exhaust temperature and/or the initial upstream $NO_x$ level. For example, to achieve a desired response in the downstream $NO_x$ level, the increase in the upstream $NO_x$ level may be greater when the initial upstream $NO_x$ level and the exhaust temperature are low than when the initial upstream $NO_x$ level and the exhaust temperature are high.

In step 308, control detects the downstream $NO_x$ level change in response to the upstream $NO_x$ level increase. In step 310, control determines whether the downstream $NO_x$ level change is less than the minimum downstream $NO_x$ level change. The downstream $NO_x$ level change is less than the minimum downstream $NO_x$ level change when the SCR catalyst 128 is saturated with $NH_3$. When the downstream $NO_x$ level change is less than the minimum downstream $NO_x$ level change, control detects a $NH_3$ slip condition in step 312, decreases the $NH_3$ storage level in the SCR catalyst 128 in step 314, and returns to step 300. Control may decrease the $NH_3$ storage level in the SCR catalyst 128 by decreasing the level of dosing agent injected and/or increasing the upstream $NO_x$ level.

When the downstream $NO_x$ level change is greater than or equal to the minimum downstream $NO_x$ level change, control determines whether the $NO_x$ level change is greater than the maximum downstream $NO_x$ level change in step 316. When the downstream $NO_x$ level change is greater than the maximum downstream $NO_x$ level change, control detects a low $NH_3$ storage condition in step 318, increases the $NH_3$ storage level in the SCR catalyst 128 in step 320, and returns to step 300. Control may increase the $NH_3$ storage level in the SCR catalyst 128 by increasing the level of dosing agent injected and/or decreasing the upstream $NO_x$ level. When the downstream $NO_x$ level change is less than or equal to the maximum downstream $NO_x$ level change, control returns to step 300.

Control may decrease the $NH_3$ storage level in step 314 when an $NH_3$ slip condition is detected in step 312 a first predetermined number of cycles. Control may increase the $NH_3$ storage level in step 320 when a low NH3 storage condition is detected in step 318 a second predetermined number of cycles. Control may initialize an estimated $NH_3$ storage level when control increases and/or decreases the NH3 storage level in the SCR catalyst 128.

Figure 4:
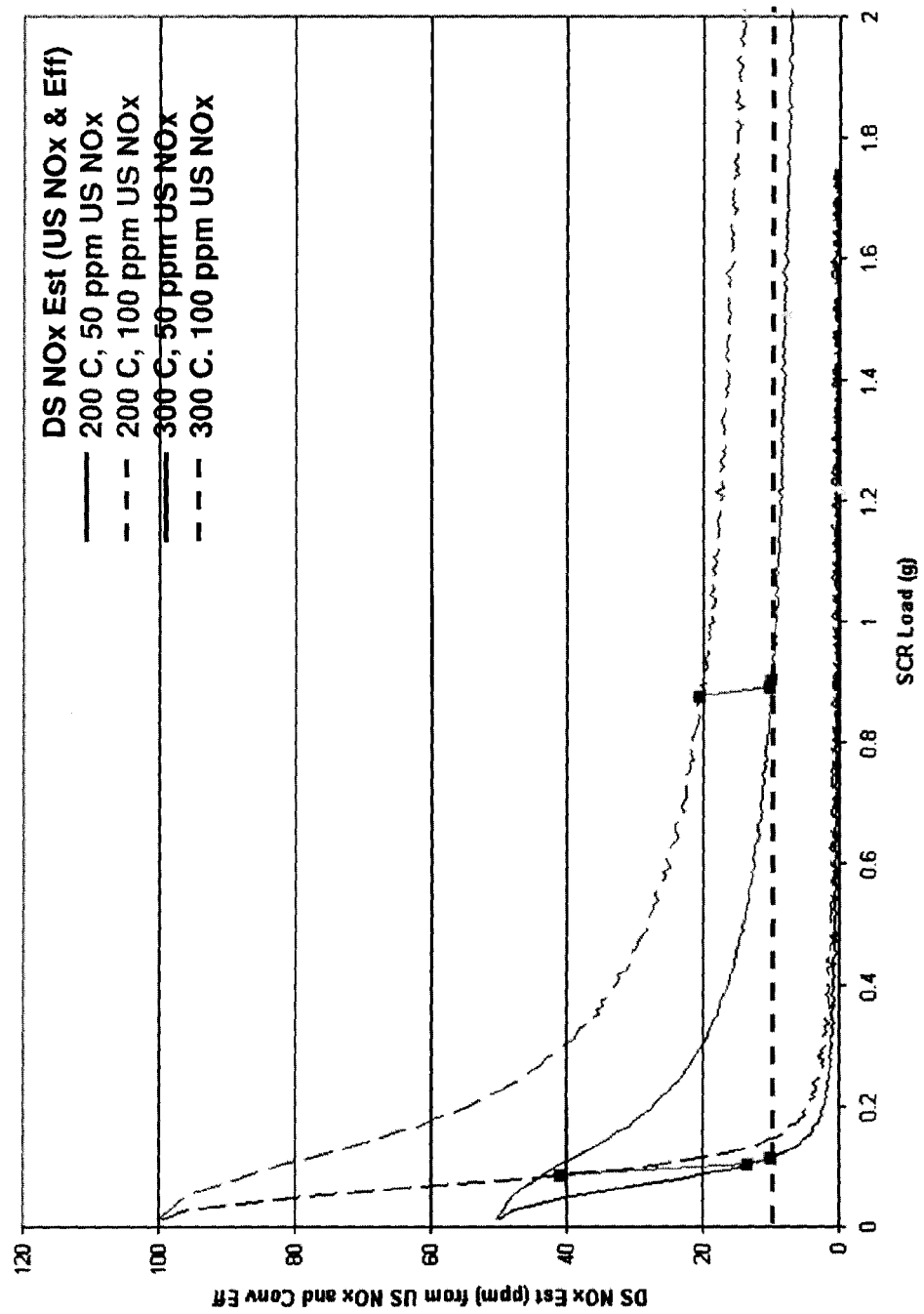
FIG. 4 is a graph illustrating relationships between a selective catalytic reduction (SCR) load and a nitrogen oxide (NO$_x$) level.

Referring now to FIG. 4, relationships between a selective catalytic reduction load (SCR Load) and a downstream $NO_x$ level (DS $NO_x$ Est) are illustrated. The SCR load represents an $NH_3$ storage level in an SCR catalyst. The downstream $NO_x$ level represents a $NO_x$ level in an exhaust system downstream of the SCR catalyst.

The lighter solid line represents the downstream $NO_x$ level when the exhaust temperature is 200 C and the upstream $NO_x$ level is 50 ppm. The lighter dashed line represents the downstream $NO_x$ level when the exhaust temperature is 200 C and the upstream $NO_x$ level is 100 ppm. The darker solid line represents the downstream $NO_x$ level when the exhaust temperature is 300 C and the upstream $NO_x$ level is 50 ppm. The darker dashed line represents the downstream $NO_x$ level when the exhaust temperature is 300 C and the upstream $NO_x$ level is 100 ppm.

The relationships between the SCR load and the downstream $NO_x$ level demonstrate that the downstream $NO_x$ level is more susceptible to perturbations in the upstream $NO_x$ level when the SCR load is lower and the exhaust temperature is higher. A perturbation in the upstream $NO_x$ when the SCR load is approximately 0.9 g results in an approximately 10 ppm increase in the downstream $NO_x$ level. A perturbation in the upstream $NO_x$ when the SCR load is approximately 0.1 g results in an approximately 25 ppm increase in the downstream $NO_x$ level.

The upstream $NO_x$ level may be perturbed by temporarily increasing the mass airflow (MAF) entering the engine. As discussed above, the magnitude of the downstream $NO_x$ level response provides an indication of the SCR load. Thus, a change in the downstream $NO_x$ level response to a temporary increase in the MAF provides an indication of the SCR load.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
 a first electronic circuit configured to increase an upstream nitrogen oxide ($NO_x$) level for a predetermined period, wherein said upstream $NO_x$ level is a $NO_x$ level upstream from a selective catalytic reduction (SCR) catalyst in an exhaust system;
 a second electronic circuit configured to detect a $NH_3$ storage condition based on a magnitude of a difference between a first downstream $NO_x$ level measured downstream from said SCR catalyst before said upstream $NO_x$ level is increased and a second downstream $NO_x$ level measured downstream from said SCR catalyst after said upstream $NO_x$ level is increased;
 a third electronic circuit configured to determine a total $NO_x$ mass entering said SCR catalyst as a result of said increase in said upstream NOx level, wherein said first electronic circuit is configured to adjust said predetermined period based on said total NOx mass;
 a fourth electronic circuit configured to adjust at least one of a dosing agent injection amount and said upstream NOx level based on said $NH_3$ storage condition and at least one of:
  adjust said dosing agent injection amount using a dosing valve of a dosing system; and
  adjust said upstream NOx level using at least one of an exhaust gas recirculation (EGR) valve, actuating a throttle valve, and actuating a fuel injector; and
 at least one of said dosing valve, said EGR valve, and said throttle valve.

2. The control system of claim 1 wherein said second electronic circuit is configured to detect a $NH_3$ slip condition when said difference is less than a minimum downstream $NO_x$ level change.

3. The control system of claim 1 wherein said second electronic circuit is configured to detect a low $NH_3$ storage level condition when said difference is greater than a maximum downstream $NO_x$ level change.

4. The control system of claim 1 wherein said first electronic circuit is configured to increase said upstream NOx level by increasing mass airflow (MAF).

5. The control system of claim 1 wherein said first electronic circuit is configured to increase said upstream $NO_x$ level by advancing injection timing.

6. The control system of claim 1 wherein said third electronic circuit is configured to determine said total $NO_x$ mass based on at least one of an exhaust temperature and said upstream $NO_x$ level.

7. A control system, comprising:
a first electronic circuit configured to increase an upstream nitrogen oxide ($NO_x$) level for a predetermined period, wherein said upstream $NO_x$ level is a $NO_x$ level upstream from a selective catalytic reduction (SCR) catalyst in an exhaust system;
a second electronic circuit configured to detect a $NH_3$ storage condition based on a magnitude of a difference between a first downstream $NO_x$ level measured downstream from said SCR catalyst before said upstream $NO_x$ level is increased and a second downstream $NO_x$ level measured downstream from said SCR catalyst after said upstream $NO_x$ level is increased;
a third electronic circuit configured to determine a filtered $NO_x$ level by filtering said upstream $NO_x$ level at a frequency that limits an increase in said filtered $NO_x$ level caused by increasing said upstream $NO_x$ level for said predetermined period;
a fourth electronic circuit configured to (i) control a dosing agent injection amount based on said filtered $NO_x$ level, (ii) adjust at least one of said dosing agent injection amount and said upstream NOx level based on said $NH_3$ storage condition, and (iii) at least one of:
adjust said dosing agent injection amount using a dosing valve of a dosing system; and
adjust said upstream NOx level using at least one of an exhaust gas recirculation (EGR) valve, actuating a throttle valve, and actuating a fuel injector; and
at least one of said dosing valve, said EGR valve, and said throttle valve.

8. A method, comprising:
increasing an upstream nitrogen oxide ($NO_x$) level for a predetermined period, wherein said upstream $NO_x$ level is a $NO_x$ level upstream from a selective catalytic reduction (SCR) catalyst in an exhaust system;
detecting an ammonia ($NH_3$) storage condition based on a magnitude of a difference between a first downstream $NO_x$ level measured downstream from said SCR catalyst before said upstream $NO_x$ level is increased and a second downstream $NO_x$ level measured downstream from said SCR catalyst after said upstream $NO_x$ level is increased;
determining a total $NO_x$ mass entering said SCR catalyst as a result of said increase in said upstream NOx level;
adjusting said predetermined period based on said total $NO_x$ mass;
adjusting at least one of a dosing agent injection amount and said upstream NOx level based on said $NH_3$ storage condition; and
at least one of:
adjusting said dosing agent injection amount using a dosing valve of a dosing system; and
adjusting said upstream NOx level using at least one of an exhaust gas recirculation (EGR) valve, actuating a throttle valve, and actuating a fuel injector.

9. The method of claim 8 further comprising detecting a $NH_3$ slip condition when said difference is less than a minimum downstream $NO_x$ level change.

10. The method of claim 8 further comprising detecting a low $NH_3$ storage level condition when said difference is greater than a maximum downstream $NO_x$ level change.

11. The method of claim 8 further comprising increasing said upstream $NO_x$ level by increasing mass airflow (MAF).

12. The method of claim 8 further comprising increasing said upstream $NO_x$ level by advancing injection timing.

13. The method of claim 8 further comprising determining said total $NO_x$ mass based on at least one of an exhaust temperature and said upstream $NO_x$ level.

14. A method, comprising:
increasing an upstream nitrogen oxide ($NO_x$) level for a predetermined period, wherein said upstream $NO_x$ level is a $NO_x$ level upstream from a selective catalytic reduction (SCR) catalyst in an exhaust system;
detecting an ammonia ($NH_3$) storage condition based on a magnitude of a difference between a first downstream $NO_x$ level measured downstream from said SCR catalyst before said upstream $NO_x$ level is increased and a second downstream $NO_x$ level measured downstream from said SCR catalyst after said upstream $NO_x$ level is increased;
determining a filtered $NO_x$ level by filtering said upstream $NO_x$ level at a frequency that limits an increase in said filtered $NO_x$ level caused by increasing said upstream $NO_x$ level for said predetermined period;
controlling a dosing agent injection amount based on said filtered $NO_x$ level;
adjusting at least one of said dosing agent injection amount and said upstream NOx level based on said $NH_3$ storage condition; and
at least one of:
adjusting said dosing agent injection amount using a dosing valve of a dosing system; and
adjusting said upstream NOx level using at least one of an exhaust gas recirculation (EGR) valve, actuating a throttle valve, and actuating a fuel injector.

15. The control system of claim 1 wherein said first electronic circuit is configured to increase said upstream NOx level by a first amount that is based on said upstream NOx level before said upstream NOx level is increased.

16. The method of claim 8 further comprising increasing said upstream NOx level by a first amount that is based on said upstream NOx level before said upstream NOx level is increased.

17. The control system of claim 1 wherein said first, second, and third electronic circuits include at least one of an Application Specific Integrated Circuit (ASIC), a processor and memory including one or more programs, and a combinational logic circuit.

18. The control system of claim 7 wherein said first, second, third, and fourth electronic circuits include at least one of an Application Specific Integrated Circuit (ASIC), a processor and memory including one or more programs, and a combinational logic circuit.

* * * * *